3,677,954
LIQUID ABRASIVE CLEANSER COMPOSITION

Meiken Nakajima, Ichikawa, and Yunosuke Nakagawa, Koshigaya, Japan, assignors to Kao Soap Co. Ltd., Tokyo, Japan
No Drawing. Filed July 24, 1970, Ser. No. 58,171
Claims priority, application Japan, July 28, 1969, 44/59,812; Dec. 27, 1969, 45/1,912
Int. Cl. C11d 3/14, 9/20, 13/00
U.S. Cl. 252—121                           4 Claims

ABSTRACT OF THE DISCLOSURE

A stable liquid scouring cleanser composition is comprised of 30–70% by weight of abrasive particles, from 15–60% by weight of water, from 1–10% by weight of a nonionic surfactant having an HLB lower than about 10 and from 1–10% by weight of an anionic surfactant. The composition may also contain from 0.1–10% by weight of a solubilizing agent to prevent separation of the constituents upon repeated freezing and thawings. The composition is prepared by homogeneously dispersing the constituents at a temperature of 50 to 100° C. with stirring.

BACKGROUND OF THE INVENTION

Field of the invention

The present invention relates to liquid scouring cleanser compositions. More particularly, the invention relates to liquid scouring cleanser compositions capable of maintaining their fluidity and avoiding separation of their components during long storage.

Description of the prior art

Conventional commercially available scouring cleansers are powdery products composed of powders of minerals or stones and rocks containing silica as a main ingredient and also containing a surfactant and/or a bleaching agent as additional ingredient(s). Such powdery scouring cleansers have generally been mixed with water at the time of use to form a suspension or slurry. Therefore, products in which the scouring cleanser ingredients are suspended in water are desirable.

As a matter of course, liquid products of a high fluidity can be handled more easily than pasty products of a lower fluidity. However, if a liquid product is prepared by adding water to a conventional powdery scouring cleanser, handling of the resulting product is quite troublesome, because the solid components in the scouring cleanser separate and precipitate rapidly and, at the time of use, a large amount of energy is required for agitating or stirring the product so as to disperse the solid components again.

Scouring cleanser compositions prepared by adding water to powdery products, in which the solid components once separated or precipitated can be dispersed again easily, have been proposed. However, inconvenience in the use or in the preparation thereof cannot be avoided by such compositions and, moreover, the desired excellent abrasive property of the scouring cleanser is often sacrificed in order to improve the dispersibility. Most of the conventional powdery scouring cleansers for domestic use irritate the skin due to their acidity or alkalinity and neutral products which do not irritate the skin have been desired.

SUMMARY OF THE INVENTION

We have discovered that a substantially neutral liquid scouring cleanser composition having a stable fluidity and which does not separate during long storage at a low temperature, such as 5° C., can be obtained by dispersing in water, particles of a water-insoluble abrasive composed of a mineral, stone or rock powder, such as silica, as the component to be employed mainly for its abrasive effect, in the presence of a combination of a nonionic surfactant having an HLB of less than about 10 and an anionic surfactant.

Further, we have discovered that, if a solubilizing agent is also employed, in addition to said combination of a non-ionic surfactant having an HLB of less than about 10 and an anionic surfactant, when said water-insoluble abrasive is dispersed in water, there can be obtained a neutral liquid scouring cleanser composition having further improved stable fluidity and in which no separation of the components of the system occurs even upon repeating freezing and thawing of the liquid composition.

Nonionic surfactants having an HLB of less than about 10 are used as dispersing agents for increasing the viscosity and they include, for example, polyoxyethylenealkyl ($C_{10}$–$C_{20}$) ethers such as polyoxyethylene(5) lauryl ether (HLB 9.7); polyoxyethylene alkyl ($C_8$–$C_{10}$) phenyl ethers such as polyoxyethylene(3)octylphenyl ether (HLB 7.8), polyoxyethylene(4)nonylphenyl ether (HLB 8.9) and polyoxyethylene(5)nonylphenyl ether (HLB 9.2); fatty acid esters of sorbitan such as sorbitan sesquioleate (HLB 4.8) and polyoxyethylene(4)sorbitan monostearate (HLB 9.6) and ethylene oxide adducts thereof; fatty acid monoglycerides such as glycerol monooleate (HLB 3.2) and glycerol monostearate (HLB 3.5); and polyoxypropylene-polyoxyethylene block polymers.

As anionic surfactants, there may be exemplified alkylbenzenesulfonates having an alkyl group of 12–20 carbon atoms, alkylsulfuric esters having 12–20 carbon atoms, alkanesulfonates having 12–20 carbon atoms, higher fatty acid salts having 12–18 carbon atoms, higher fatty acid monoglyceride sulfates having 12–18 carbon atoms and alkylphenylpolyoxyethylene ether sulfates having 8–20 carbon atoms.

Solubilizing agents to be used in the present invention are compounds commonly called as hydrotropes, which include, for example, benzene sulfonates, para-toluene sulfonates, xylene sulfonates, benzoates, toluylates, caproates and caprylates.

Nonionic surfactants to be used in the present invention should have an HLB of lower than about 10, preferably an HLB of about 3–10. If a nonionic surfactant having an HLB of higher than 10 is used, the viscosity of the system will be too low in general and the separation of the solid components will be observed immediately after the preparation of the scouring cleanser composition.

The reason for using a nonionic surfactant of an HLB of lower than 10 is not simply for maintaining high the viscosity of the liquid. Even if a viscosity increasing agent, such as polyethylene glycol, polyvinyl alcohol or polyvinyl pyrrolidone, is used to increase the viscosity, the separation of the solid components cannot be prevented and, accordingly, stable liquid scouring cleansers cannot be obtained.

As the water-insoluble abrasives to be employed in the composition of the present invention, there may be used, for example, silicon dioxide, aluminum oxide, magnesium oxide, silicon carbide, boron carbide, iron oxide and chromium oxide and, in addition, finely pulverized natural products such as corundum, emery, silica, diamond, dolomite, sand and shell.

The preferable particle size of the abrasives is such that more than 80% of the particles pass through a 325 mesh Tyler sieve and more than 99% pass through a 100 mesh sieve.

In the compositions of the present invention, the amount of the nonionic surfactant of an HLB 10 or less is 1–10% by weight, preferably 2–4% by weight, based on the total weight of the composition and the amount of the anionic surfactant is 1–10% by weight, preferably 2-7% by weight, based on the total weight of the composition.

In case the solubilizing agent is used, the amount thereof is 0.1 to 10% by weight, preferably 0.5 to 5% by weight, based on the total weight of the composition. The amount of the abrasive used is 30-70% by weight, preferably 40-60% by weight, based on the total weight of the composition. The water content of the final product is 15-60% by weight, preferably 20-50% by weight, based on the total weight of the composition. The pH value of the liquid scouring cleanser composition is 5-9, preferably 6-8.

The composition of the present invention may contain, in accordance with its intended use, other surfactants, perfumes, pigments, dyes, etc.

The liquid scouring cleanser composition of the present invention can be prepared in a simple manner by adding an abrasive into a heated mixture prepared by homogeneously mixing a nonionic surfactant having an HLB of lower than about 10, an anionic surfactant and, if desired, a solubilizing agent in a homomixer, or by stirring under heat an aqueous mixture containing a nonionic surfactant having an HLB of lower than about 10, an anionic surfactant, an abrasive and, if desired, a solubilizing agent. The heating temperature is generally 50-100° C., preferably 60-80° C., and the heating is carried out generally for 5-30 minutes. There is no harm in heating the composition a longer time, but the same is uneconomical.

Liquid scouring cleanser compositions according to the present invention can be stored for a long time and they will remain stable. Particularly, a liquid scouring composition according to the present invention containing additionally a solubilizing agent therein shows a further improved stability such that the composition is still stable and no separation of the components thereof occurs even after a severe storage condition, such as repeated freezings and subsequent thawings, for a long time. Further, the compositions of the present invention hardly affect human hands or skin because they are substantially neutral in property. A large surface area can be polished or cleansed with a small amount of the composition owing to the good dispersion of the abrasive ingredients therein.

The present invention will now be further described below by means of illustrative examples.

All references in the examples to "parts" shall refer to parts by weight.

EXAMPLE 1

Various kinds of (1) surfactants alone, (2) mixtures thereof with other surfactants or other nonsurfactant compounds, used in the respective predetermined amounts as listed below, were respectively added to water and each test sample was heated to obtain a homogeneously dispersed and dissolved liquid. Keeping the system at 80° C., a predetermined amount of sand was added with stirring to obtain 100 parts of a product. The product was stirred at 80° C. for an additional 30 minutes to obtain the intended liquid cleanser composition.

The stability of each composition was observed. The results were as shown in Table 1.

TABLE 1

| | Surfactants and high molecular compounds | Stability |
|---|---|---|
| A¹ | Polyoxyethylene(4)nonylphenyl ether (I). | X Surfactant was not dispersed. |
| | Polyoxyethylene(9)nonylphenyl ether (II). | X Separation was observed immediately after preparation. |
| | Sodium dodecylbenzenesulfonate (III). | Do. |
| | Dodecyltrimethylammonium chloride (IV). | Do. |

See footnote at end of table.

TABLE 1—Continued

| | Surfactants and high molecular compounds | Stability |
|---|---|---|
| B² | (I) and (II) | X Separation was observed immediately after preparation. |
| | (I) and (III) | ⊚ Separation was not observed after storage at room temperature at 16,000 cps. (20° C.) for longer than 3 months. |
| | (I) and (IV) | X Separation was observed immediately after the preparation. |
| | (I) and laurylbetaine | Do. |
| C³ | (III) and (II) | Do. |
| | (III) and sodium tetradecylsulfate. | Do. |
| | (III) and (IV) | X Surfactant was separated and not dispersed. |
| | (III) and polyethyleneglycol (molecular weight 20,000). | X Immediate separation was observed. |
| | (III) and polyvinylpyrrolidone (molecular weight 360,000). | X Separation was observed after storage for one day at room temperature. |
| | (III) and polyvinylalcohol (molecular weight above 1,500). | Do. |
| | (III) and sodium polyacrylate (molecular weight 20,000-27,000). | Do. |

NOTE.—The compositions of the samples in the above groups A, B and C were as follows:

| | | Parts |
|---|---|---|
| Group A | Surfactant (I to IV) | 5 |
| | Sand | 55 |
| | Water | 40 |
| Group B | Surfactant (I) | 2 |
| | Other surfactant | 3 |
| | Sand | 55 |
| | Water | 40 |
| Group C | Surfactant (III) | 3 |
| | Other surfactant or high molecular compound | 2 |
| | Sand | 55 |
| | Water | 40 |

As will be apparent from Table 1, a sufficiently stable and fluid liquid cleanser composition was obtained only from the combination of polyoxyethylene(4)nonylphenyl ether (nonionic surfactant of HLB 8.9) and sodium dodecylbenzenesulfonate (anionic surfactant) according to the present invention.

EXAMPLE 2

The influence of the HLB of the nonionic surfactant in the liquid cleanser composition of the present invention on the viscosity and stability of the composition was determined in the following manner.

Two parts of polyoxyethylenenonylphenyl ether (as the nonionic surfactant) of various HLB, as listed below, 4 parts of sodium dodecylbenzenesulfonate (as the anionic surfactant) and 55 parts of sand were added to water to make 100 parts of a product, with stirring and heating the mixture at 90° C. When the addition was completed, the heating was stopped and the mixture was cooled, with stirring, to 70° C. over a period of 30 minutes. The stirring was continued until the composition was cooled to room temperature. The viscosities (20° C.) of the resulting compositions were determined with a Brookfield viscometer (rotor No. 3, 6 r.p.m.). The viscosities and stabilities determined were as listed in Table 2.

TABLE 2

| HLB | Viscosity (20° C.) cps. | Stability |
|---|---|---|
| 7.8 | 50,000 | |
| 9.2 | 15,000 | Stable during a long storage. |
| 9.6 | 11,000 | |
| 10.0 | 10,000 | |
| 10.4 | 9,000 | |
| 11.6 | 3,000 | Separation occurred immediately after the preparation. |
| 12.2 | 1,000 | |
| 13.7 | 800 | |
| 14.6 | 700 | |

As shown in the above table, the viscosity of the product was high and no separation was observed at an HLB of lower than about 10, but separation occurred at an HLB of more than about 11 immediately after the preparation.

EXAMPLE 3

To 40 parts of water were added 3 parts of polyoxyethylene (5) nonylphenyl ether (HLB 9.2) and 2 parts of sodium dodecylbenzenesulfonate, and the whole was heated to obtain a homogeneous dispersion. While the system was kept at 80° C., 55 parts of silica were added thereto with stirring to make a total of 100 parts of product. The product was stirred at 80° C. for an additional 30 minutes. Thus, a fluid liquid scouring cleanser was prepared.

The viscosity of the cleanser was 15,000 cps. (Brookfield viscometer, rotor No. 3, 6 r.p.m., 20° C.). The cleanser was still stable after it was stored in constant temperature rooms at 5° C., 20° C., 30° C. and 40° C. for 6 months.

EXAMPLE 4

To 45 parts of water were added 2 parts of polyoxyethylene(3)octylphenyl ether (HLB 7.8) and 3 parts of sodium dodecylsulfate, and the whole was mixed homogeneously in a homomixer. While the system was kept at 70° C., 50 parts of silica were added thereto with stirring, and the stirring was continued for an additional 30 minutes. The resulting liquid scouring cleanser was sufficiently fluid. The viscosity of the cleanser was 13,000 cps. (Brookfield viscometer, rotor No. 3, 6 r.p.m., 20° C.). The cleanser was still stable and no separation was observed after storage in closed vessels placed in constant temperature rooms at 5° C., 20° C., 30° C. and 40° C. for 3 months.

EXAMPLE 5

To 41 parts of water were added 2 parts of polyoxyethylene(5)nonylphenyl ether (HLB 9.2) and 2 parts of sodium nonylphenylpolyoxyethylene(3) ether sulfate, and the whole was mixed homogeneously in a homomixer. Into this system, 55 parts of corundum were added and the whole was thoroughly mixed to obtain liquid cleanser composition (A). The composition (A) was then stirred with heating to keep the temperature at 80° C. for 30 minutes. Thus, a liquid cleanser composition (B) was obtained.

Separation of corundum was observed in the composition (A) one day after it was prepared. On the other hand, no separation was observed in the composition (B) after it was stored in constant temperature rooms at 5° C., 20° C., 30° C. and 40° C. for 2 months.

EXAMPLE 6

To 41 parts of water were added 2 parts of oleic acid monoglyceride (HLB 3.4) and 3 parts of sodium dodecylbenzenesulfonate, and the whole was heated to obtain a homogeneous dispersion. Under stirring and keeping the temperature at 80° C., 45 parts of sand were added to the mixture to make the total amount thereof 100 parts. The product was stirred at 80° C. for an additional 30 minutes to obtain a liquid scouring cleanser.

The viscosity of the cleanser at 20° C. was 18,000 cps., and the cleanser was still stable and no separation was observed after 3 months' storage at 40° C.

EXAMPLE 7

The ingredients of the compositions A and B listed in the following Table 3 were mixed with stirring and heating to keep the mixture at 80° C. for 30 minutes, after which the heating was stopped and the mixture was cooled, without external cooling under continued stirring, to room temperature to obtain liquid scouring cleanser compositions A and B.

TABLE 3

| Ingredients (parts by weight) | Composition A | Composition B |
|---|---|---|
| Polyoxyethylene(4)nonylphenyl ether (HLB 8.9) | 2 | 2 |
| Sodium dodecylbenzene sulfate | 4 | 4 |
| Sodium p-toluene sulfate | 0 | 4 |
| Silica | 50 | 50 |
| Water | 44 | 40 |

Then the compositions A and B were stored in constant temperature rooms at 5° C., 30° C. and 40° C. for 3 months, but these two compositions were still stable after the storage and no separation occurred.

On the other hand, these compositions A and B were left at a temperature of −5° C. for one week to freeze the compositions, then left in a constant temperature room at 30° C. for 1 week to thaw the frozen composition. In the composition A, separation of the ingredients of the composition occurred after 1 cycle of the above test (for 2 weeks), but, in the composition B, no separation occurred after 6 cycles (for 12 weeks).

EXAMPLE 8

The ingredients of the compositions C and D listed in the following Table 4 were heated in a separable flask to raise the temperature thereof to 90° C. After the temperature reached 90° C., the heating was stopped and then the mixture was cooled, without external cooling under continued stirring, to room temperature to obtain fluid liquid scouring cleanser compositions C and D.

TABLE 4

| Ingredients (parts by weight) | Composition C | Composition D |
|---|---|---|
| Polyoxyethylene(5)nonylphenyl ether (HLB 9.2) | 3 | 3 |
| Sodium dodecylbenzene | 2 | 2 |
| Sodium benzoate | 0 | 3 |
| Silica | 55 | 55 |
| Water | 40 | 37 |

The viscosities of these compositions were 16,500 cps. for the composition C and 13,000 cps. for the composition D. The compositions C and D were stored in constant temperature rooms at 5° C., 20° C., 30° C. and 40° C. for 3 months, but these two compositions were still stable after the storage and no separation occurred.

On the other hand, samples of these compositions C and D were left at a temperature of −5° C. for one week to freeze the compositions, then they were left in a constant temperature room at 30° C. to thaw the frozen composition. In the composition C, the separation of the constituents of the composition occurred after 1 cycle of the above test (for 2 weeks), but, in the composition D, no separation of the constituents was observed after 6 cycles (for 12 weeks) in spite of the fact that the viscosity of the composition D was lower than that of the composition C.

EXAMPLE 9

The nonionic surfactants, anionic surfactants and solubilizing agents listed in the following Table 5 were mixed with abrasive and stirred with water at 80° C. for 30 minutes. Then the heating was stopped and the mixture was cooled, without external cooling under continued stirring, to room temperature to obtain fluid liquid scouring cleanser compositions E to T. The compositions thus produced were stored in constant temperature rooms at 5° C. and 40° C. for 3 months. On the other hand, samples of these compositions were stored at the temperature of −5° C. for one week to freeze the compositions, then stored at the temperature of 30° C. to remelt the compositions, and this freezing-thawing cycle was repeated 6 times. The results of these storage stability tests were as listed in the following Table 5. In the table, the amounts of the ingredients are all parts by weight.

TABLE 5

| Ingredients | | E | F | G | H | I | J | K | L | M | N | O | P | Q | R | S | T | U | V |
|---|---|---|---|---|---|---|---|---|---|---|---|---|---|---|---|---|---|---|
| Nonionic surfactants | POE(3)octylphenyl ether | 2 | 2 | | | | | | | 2 | | 2 | | | | | | | |
| | POE(5)nonylphenyl ether | | | 3 | | | 2 | 4 | | | | | 3 | | | | 2 | 4 | |
| | Glycerol monooleate | | | | 2 | | | | | | | | | 2 | | | | | |
| | POE(5)lauryl ether | | | | | 3 | 3 | | 3 | | | | | | 3 | 3 | | | 3 |
| Anionic surfactants | Sodium lauryl sulfate | 3 | | | | | 3 | | | 3 | | | | | | | | | |
| | Sodium dodecylbenzene sulfate | | 3 | 3 | 3 | | 4 | 3 | 4 | | 3 | 3 | 3 | | 4 | 3 | 4 | | |
| | Sodium nonylphenyl POE(3)ether sulfate | | | | | 3 | | | | | | | | 3 | 3 | | | | |
| Solubilizing agents | Sodium benzene sulfonate | | | | | | | | | 3 | 0.5 | | | | | | | | |
| | Sodium p-toluene sulfonate | | | | | | | | | | | 3 | | | | | | | |
| | Sodium xylene sulfonate | | | | | | | | | | | | 3 | | | | | | |
| | Sodium benzoate | | | | | | | | | | | | | 3 | | | 1 | 3 | |
| | Sodium caproate | | | | | | | | | | | | | 4 | | | | | 0 |
| Abrasive | Silica | 50 | 55 | 55 | 60 | 50 | 50 | 50 | 40 | 50 | 50 | 55 | 55 | 60 | 50 | 50 | 50 | 40 | 52 |
| Others | Water | 55 | 40 | 39 | 35 | 44 | 44 | 44 | 53 | 43 | 42 | 39.5 | 36 | 31 | 41 | 41 | 43 | 50 | 41 |
| Results of storage tests | 40° C. (after 3 months) | ⓞ | ⓞ | ⓞ | ⓞ | ⓞ | ⓞ | ⓞ | ⓞ | ⓞ | ⓞ | ⓞ | ⓞ | ⓞ | ⓞ | ⓞ | ⓞ | ⓞ | ⓞ |
| | 5° C. (after 3 months) | ⓞ | ⓞ | ⓞ | ⓞ | ⓞ | ⓞ | ⓞ | ⓞ | ⓞ | ⓞ | ⓞ | ⓞ | ⓞ | ⓞ | ⓞ | ⓞ | ⓞ | ⓞ |
| | Repeating of freezing-remelting (after 3 months) | X | X | X | X | X | X | X | X | ⓞ | ⓞ | ⓞ | ⓞ | ⓞ | ⓞ | ⓞ | ⓞ | ⓞ | ⓞ |

Note.—The mark ⓞ represents "stable" and the mark X represents separation."

The embodiments of the invention in which an exclusive property or privilege is claimed are defined as follows:

1. A stable, liquid, scouring cleanser composition, which consists essentially of, by weight of the total composition,
   (A) from about 30% to about 70% of finely divided, water insoluble inorganic abrasive particles of which 99% pass through a 100 mesh sieve,
   (B) from about 15% to about 60% of water,
   (C) from about 1% to about 10% of nonionic surfactant having an HLB value of from about 3 to 10 and selected from the group consisting of
      polyoxyethylene alkyl ($C_{10}$–$C_{20}$) ethers,
      polyoxyethylene alkyl ($C_8$–$C_{10}$) phenyl ethers,
      fatty acid esters of sorbitan and ethylene oxide adducts thereof,
      fatty acid monoglycerides, and
      polyoxypropylene/polyoxyethylene block polymers.
   (D) from about 1% to about 10% of anionic surfactant selected from the group consisting of
      alkylbenzenesulfonates having an alkyl group of 12–20 carbon atoms,
      alkylsulfuric esters having 12–20 carbon atoms,
      alkanesulfonates having 12–20 carbon atoms,
      higher fatty acid salts having 12–18 carbon atoms,
      higher fatty acid monoglyceride sulfates having 12–18 carbon atoms, and
      alkylphenylpolyoxyethylene ether sulfates having 8–20 carbon atoms,
   said composition having a pH in the range of 5 to 9, the composition having been prepared by homogeneously dispersing the ingredients (A), (B), (C), and (D) at a temperature of 50–100° C. with stirring.

2. A liquid scouring cleanser composition as claimed in claim 1, also containing (E) from about 0.1 to 10% of a solubilizing agent selected from the group consisting of benzene sulfonates, para-toluene sulfonates, xylene sulfonates, benzoates, toluylates, caproates and caprylates.

3. A composition according to claim 1, consisting essentially of
   from about 40% to 60% of ingredient A,
   from about 20% to 50% of ingredient B,
   from about 2% to 4% of ingredient C, and
   from about 2% to 7% of ingredient D,
and the pH of the composition is in the range of 6 to 8.

4. A composition according to claim 2, consisting essentially of
   from about 40% to 60% of ingredient A,
   from about 20% to 50% of ingredient B,
   from about 2% to 4% of ingredient C,
   from about 2% to 7% of ingredient D, and
   from about 0.5% to 5% of ingredient E,
and the pH of the composition is in the range of 6 to 8.

References Cited
UNITED STATES PATENTS

| | | | |
|---|---|---|---|
| 3,522,186 | 7/1970 | Cambre | 252—112 |
| 3,281,367 | 10/1966 | Jones et al. | 252—112 |
| 3,210,286 | 10/1965 | Gangwisch | 252—137 |
| 3,210,285 | 10/1965 | Gangwisch | 252—137 |
| 3,149,078 | 9/1964 | Zmoda | 252—137 |
| 3,067,053 | 12/1962 | Tarantino | 106—308 |
| 2,994,665 | 8/1961 | Reich et. al. | 252—137 |

LEON D. ROSDOL, Primary Examiner

D. L. ALBRECHT, Assistant Examiner

U.S. Cl. X.R.

252—120, 131, 140, 313, 314, DIG 14